United States Patent
Regensburger et al.

(10) Patent No.: US 7,841,768 B2
(45) Date of Patent: Nov. 30, 2010

(54) SENSOR ARRANGEMENT FOR THE CLIMATE CONTROL OF A MOTOR VEHICLE

(75) Inventors: Johann Regensburger, Bad Neustadt a.d. Saale (DE); Georg Bauer, Bad Bocklet (DE); Andreas Kramlich, Schweinfurt (DE); Michael Reiser, Coburg (DE); Wolfgang Kuechler, Ostheim (DE)

(73) Assignee: PREH GmbH (DE)

( * ) Notice: Subject to any disclaimer, the term of this patent is extended or adjusted under 35 U.S.C. 154(b) by 0 days.

(21) Appl. No.: 12/247,038

(22) Filed: Oct. 7, 2008

(65) Prior Publication Data

US 2009/0097529 A1    Apr. 16, 2009

Related U.S. Application Data

(63) Continuation of application No. PCT/EP2007/002431, filed on Mar. 20, 2007.

(30) Foreign Application Priority Data

Apr. 7, 2006 (DE) .................. 10 2006 016 821
Feb. 28, 2007 (DE) .................. 10 2007 009 672

(51) Int. Cl.
G01K 1/14 (2006.01)
G01K 13/00 (2006.01)
G01K 17/06 (2006.01)

(52) U.S. Cl. .................. 374/141; 374/29; 374/137; 374/109

(58) Field of Classification Search .......... 374/120–121, 374/208, 29, 109, 141, 142, 152, 170, 137; 123/41.01

See application file for complete search history.

(56) References Cited

U.S. PATENT DOCUMENTS

| | | | | | |
|---|---|---|---|---|---|
| 4,655,607 | A | * | 4/1987 | Kern et al. | 374/4 |
| 4,659,236 | A | * | 4/1987 | Hobbs | 374/208 |
| 4,702,619 | A | * | 10/1987 | Camp et al. | 374/144 |
| 5,008,775 | A | * | 4/1991 | Schindler et al. | 361/679.46 |
| 5,022,766 | A | * | 6/1991 | Phipps | 374/209 |
| 5,178,464 | A | * | 1/1993 | Fraden | 374/129 |
| 5,324,049 | A | * | 6/1994 | Mistrater et al. | 279/2.17 |
| 5,558,436 | A | * | 9/1996 | Richards | 374/208 |
| 7,497,251 | B2 | * | 3/2009 | Ichishi et al. | 165/202 |

(Continued)

FOREIGN PATENT DOCUMENTS

DE    4130063 A1 *    3/1993

(Continued)

Primary Examiner—Gail Verbitsky
(74) Attorney, Agent, or Firm—Cantor Colburn LLP

(57) ABSTRACT

A sensor arrangement is provided for determining an interior temperature in a motor vehicle, which sensor arrangement is at least one part of an air-conditioning operating part, comprising a closed housing having at least one front wall and one rear wall, wherein the front wall is manufactured from a material which ensures satisfactory thermal transfer and the housing and is filled with a thermally insulating means, further comprising a first temperature sensor which is fastened to a rear side of the front wall and a second temperature sensor which interacts with the first temperature sensor at least in relation to an evaluation of the interior temperature, wherein the at least second temperature sensor is fastened on an inner side of the rear wall which faces the rear side of the front wall.

3 Claims, 2 Drawing Sheets

U.S. PATENT DOCUMENTS

| | | | |
|---|---|---|---|
| 2002/0110178 A1* | 8/2002 | Puranen et al. | 374/121 |
| 2005/0156753 A1* | 7/2005 | DeLine et al. | 340/693.5 |
| 2006/0074586 A1* | 4/2006 | Kautz et al. | 702/130 |
| 2006/0153278 A1* | 7/2006 | Chen et al. | 374/208 |
| 2009/0005136 A1* | 1/2009 | Hutzel et al. | 455/575.9 |

FOREIGN PATENT DOCUMENTS

| | | |
|---|---|---|
| DE | 197 28 803 C1 | 8/1999 |
| EP | 1 415 829 A1 | 5/2004 |
| EP | 1 440 828 A2 | 7/2004 |

* cited by examiner

Characteristic temperature profile

SENSOR ARRANGEMENT FOR THE CLIMATE CONTROL OF A MOTOR VEHICLE

This nonprovisional application is a continuation of International Application No. PCT/EP2007/002431, which was filed on Mar. 20, 2007, and which claims priority to German Patent Application Nos. 10 2006 016 821.6, which was filed in Germany on Apr. 7, 2006, and to 10 2007 009 672.2, which was filed in Germany on Feb. 28, 2007 and which are herein incorporated by reference.

BACKGROUND OF THE INVENTION

1. Field of the Invention

The invention relates to a sensor arrangement for determining an interior temperature in a motor vehicle, which sensor arrangement is at least one part of a climate control panel, having a closed housing with at least one front wall and a rear wall, whereby the front wall is made of a material assuring good heat transport and the housing is filled with a heat-insulator, a first temperature sensor attached to a back of the front wall, and a second temperature sensor, which works together with the first temperature sensor at least in regard to evaluating the interior temperature.

2. Description of the Background Art

Controlled climate units are employed so that a predefinable temperature in an interior of a motor vehicle can be set and a temperature can be maintained. Highly diverse sensors are used hereby to detect the actual value of the interior temperature. In many cases, the sensors are integrated into the climate control panel of the motor vehicle to form a self-contained unit. For this purpose, different effects on a sensor arrangement for detecting the actual temperature must be considered to detect the actual value. Thus, in particular, direct solar radiation on the sensor arrangement can falsify the measured values, which in turn results in insufficient control of the interior temperature. Apart from solar radiation, air circulation, temperature of peripheral devices, as well as the body temperature of the operator, must be considered and eliminated from the measured value to detect the interior temperature.

A sensor arrangement to detect the actual interior temperature is disclosed in European Patent Application No. EP 1 415 829 B1, which is herein incorporated by reference, and which describes a sensor arrangement for determining the interior temperature, the sensor arrangement being mounted on an exterior side of a climate control panel of a climate control unit. The sensor arrangement has a temperature sensor, which is attached to a rear side of a front wall of the sensor arrangement with good thermal contact to the front wall. The sensor housing is closed on the back by a tub-shaped plastic housing relative to the interior of the control panel.

On the one hand, a thermal coupling occurs due to the arrangement of a temperature sensor on the inner side of the front wall, and on the other, there is an extremely precise determination of a temperature before the front wall due to the good thermal conductivity of the front wall. This in turn corresponds to a temperature of the interior of the motor vehicle.

SUMMARY OF THE INVENTION

It is therefore an object of the invention to provide a sensor arrangement, which enables miniaturization of the sensor and at the same time provides for a more precise and more rapid detection of the measured values without use of a sensor ventilator unit, i.e., active sensor ventilation. In addition, interfering effects by heat sources affecting the sensor are eliminated.

In an embodiment, at least a second temperature sensor in the sensor arrangement is attached to an inner side of the rear wall, the side facing the back of the front wall. By attaching an at least second temperature sensor in the interior of the housing of the sensor arrangement, heat sources, radiating backward onto the sensor arrangement, are detected in terms of temperature, evaluated in downstream evaluation electronics, and used for a more accurate detection of the interior temperature. In contrast to the conventional art, the direct heating of the housing of the sensor arrangement is detected hereby, from which the actual heat radiation on the first temperature sensor can be detected. By integration into the housing and detection of the backward radiation of the rear wall of the housing, on the one hand, rapid adjustment of the first temperature sensor is possible and the sensor arrangement can be dimensioned a great deal smaller in its dimensions.

In the sensor arrangement of the invention, peripheral devices, which also include for this purpose a printed circuit board belonging to the climate control panel and arranged behind the sensor, can be covered by the second temperature sensor. In the case of interference, such as, for example, sunshine, a finger on the sensor arrangement, the measured values can be checked for plausibility by comparison with an energy balance and a suitable logic and if appropriate, alternatively the theoretically calculated temperature can be used as the basis for the actual temperature value for climate control. In this case, the energy balance model calculates the interior temperature from all necessary sensor and operating values, available in the control unit and in the on-board electrical system of the motor vehicle. Such operating values are, for example, the outside temperature, the exhaust temperature from the vents, the air distribution, the amount of air, a sun sensor, et cetera.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
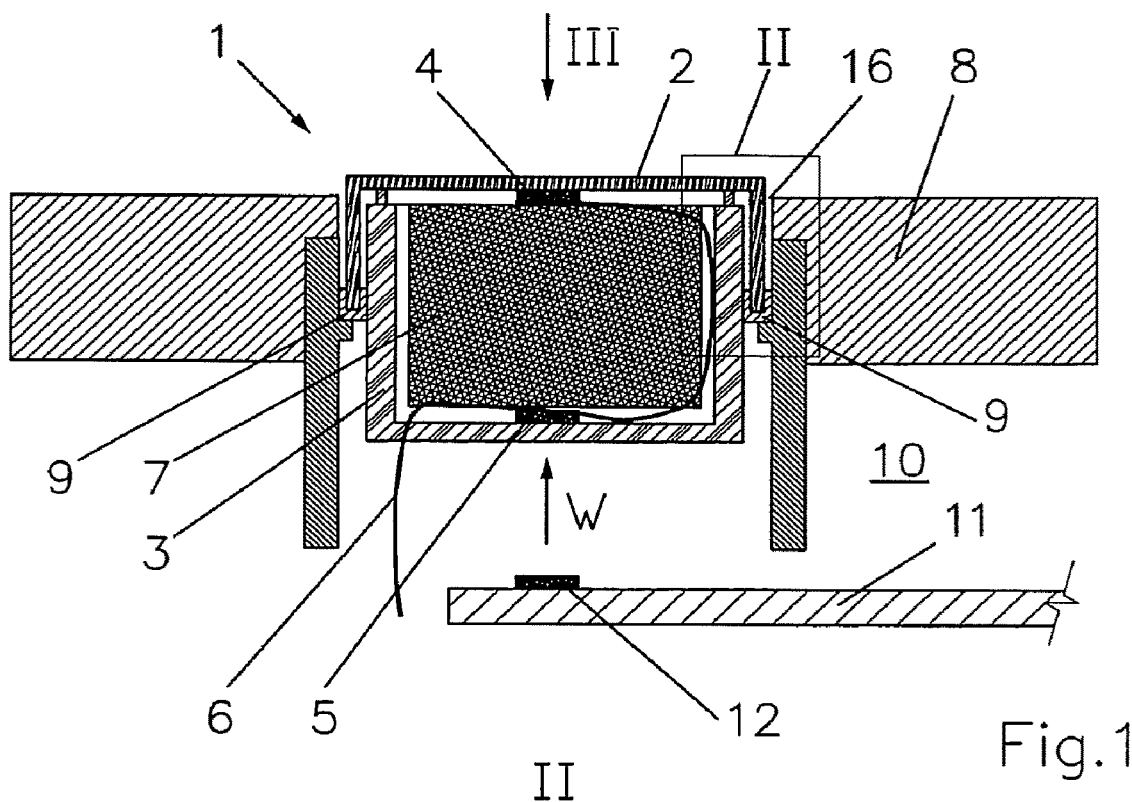
FIG. 1 illustrates a section through a climate control panel or an instrument panel in a motor vehicle, through the sensor arrangement according to an embodiment of the invention.

FIG. 1 shows a sensor arrangement 1 of the invention as a surface sensor 1, a front wall 2, which is part of the housing of surface sensor 1, a rear wall 3, made predominantly of plastic, as the rear section of the housing, a first temperature sensor 4 and a second temperature sensor 5, a flexible line 6, the flexible line 6 being connected to the two temperature sensors 4, 5, and a heat-insulator 7 located in housing 2, 3, which, on the one hand, fills housing 2, 3 and, on the other, acts as insulation between temperature sensors 4, 5. Surface sensor 1 is integrated flush or virtually flush into an aperture 8 of an operating panel of a climate control unit or directly into a dashboard 8. Sensor arrangement 1 is held by means of guide rails 9 in aperture 8. A printed circuit board 11 is shown behind surface sensor 1 in interior 10 of the climate control panel. Another temperature sensor 12 is attached to printed circuit board 11 in this exemplary embodiment.

Temperature sensor 4, which can be an NTC resistor, is attached directly to the back of front wall 2. Another NTC resistor as temperature sensor 5 is attached to a surface, facing the back of front wall 2, of the rear wall 3 of the housing of surface sensor 1. An insulating material 7 is installed into the housing between temperature sensors 4 and 5. Insulating material 7 prevents heat radiation from reaching first temperature sensor 4 from the back of the housing and thereby improves the functionality of sensor arrangement 1.

The temperature radiation originates from peripheral devices in the motor vehicle and is radiated primarily from a printed circuit board 11 disposed behind surface sensor 1, whereby heat radiation W reaches surface sensor 1 in the direction of arrow W. Such printed circuit boards 11 are typically warm to 40° C. and therefore heat the housing rear section 3 of sensor arrangement 1. This can interfere with the measured value of the first temperature sensor 4. The detrimental effect is prevented, on the one hand, by the use of an insulating material 7 in the interior of the surface sensor and, on the other, detected electronically by detection of the temperature of second temperature sensor 5 and taken into account in the evaluation. Possible insulating materials 7 in this case are PU foam, silicone foam, hollow glass spheres, or hollow ceramic spheres.

Another advantage according to the invention results when another temperature sensor 12 is attached in the immediate vicinity of sensor arrangement 1. It is therefore possible to detect directly the temperature of printed circuit board 11 or another peripheral device in the vicinity of sensor arrangement 1 and to take it into account in the evaluation and determination of the interior temperature before aperture 8. It is noted in this respect that it is also conceivable naturally according to the invention to attach the second or another additional temperature sensor in housing 2, 3 to an inner side of housing rear section 3, in such a way that other heat sources surrounding sensor 1 can be detected.

Figure 2:
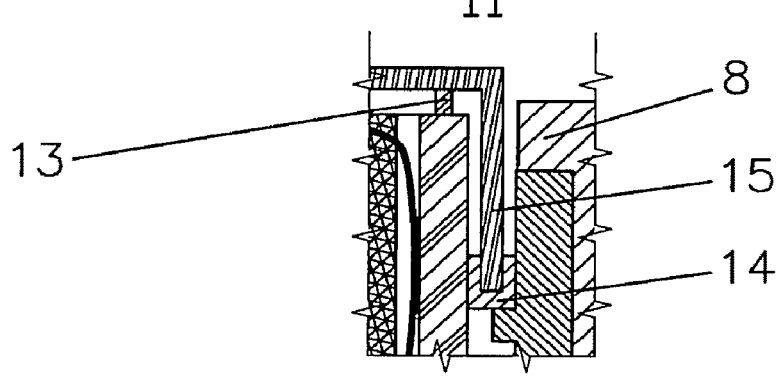
FIG. 2 shows a detail view from FIG. 2 corresponding to II.

Front wall 2 can be made of a material with good thermal conductivity. An example of this is, for example, metal and particularly aluminum and copper. First temperature sensor 4 is attached to the back of front wall 2, as also described in the prior art, to which reference is expressly made here. To exclude all interfering effects on the front wall 2 or at least to minimize them, front wall 2 is kept on support domes 13 at a distance to rear wall 3. This is clearly evident in FIG. 2. Here FIG. 2 shows a detail view corresponding to II of FIG. 1. Front wall 2, in one respect, is uniformly kept at a distance of about 0.15 mm from rear wall 3 by support domes 13 fastened to rear wall 3. To eliminate or at least to minimize the effects of the dashboard or aperture 8 of the climate control panel, front wall 2, which in this exemplary embodiment extends, on the one hand, over the side walls of rear wall 3 and completely surrounds the side walls of rear wall 3, is held in guide rails 14, which are attached to rear wall 3 or formed as a single piece from it. The areas 15 of front wall 2, said areas surrounding rear wall 3, are kept by guide rails 14 about 0.1 mm from aperture 8. Alternatively, it is also possible to dispense with support domes 13 completely and to attach front wall 2 exclusively to guide rails 14, which causes an improved thermal decoupling.

Figure 3:
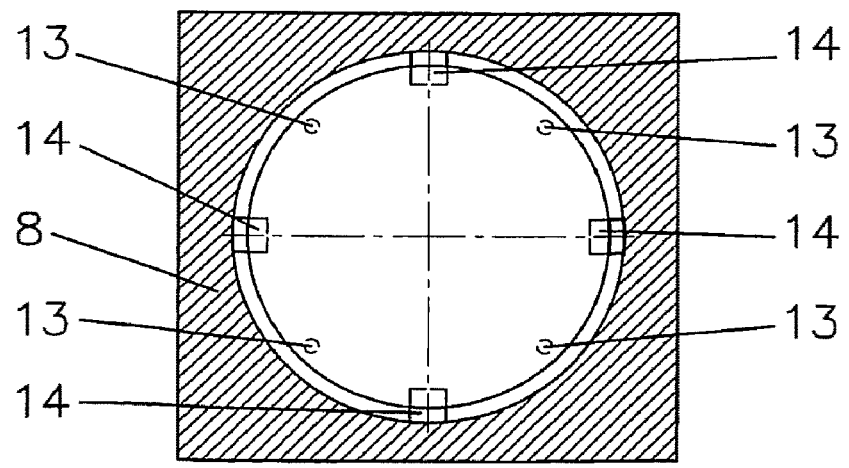
FIG. 3 is a top plan view of the sensor arrangement according to an embodiment of the invention corresponding to arrow III.

An exemplary embodiment of the invention, in which sensor arrangement 1 is made as a cylinder, is shown in FIG. 3. FIG. 3 shows a view of a surface sensor 1 from the viewpoint of arrow III of FIG. 1. The positioning of front wall 2 by support domes 13 and guide rails 14 in relation to the distance to aperture 8 is clearly evident.

Figure 4:
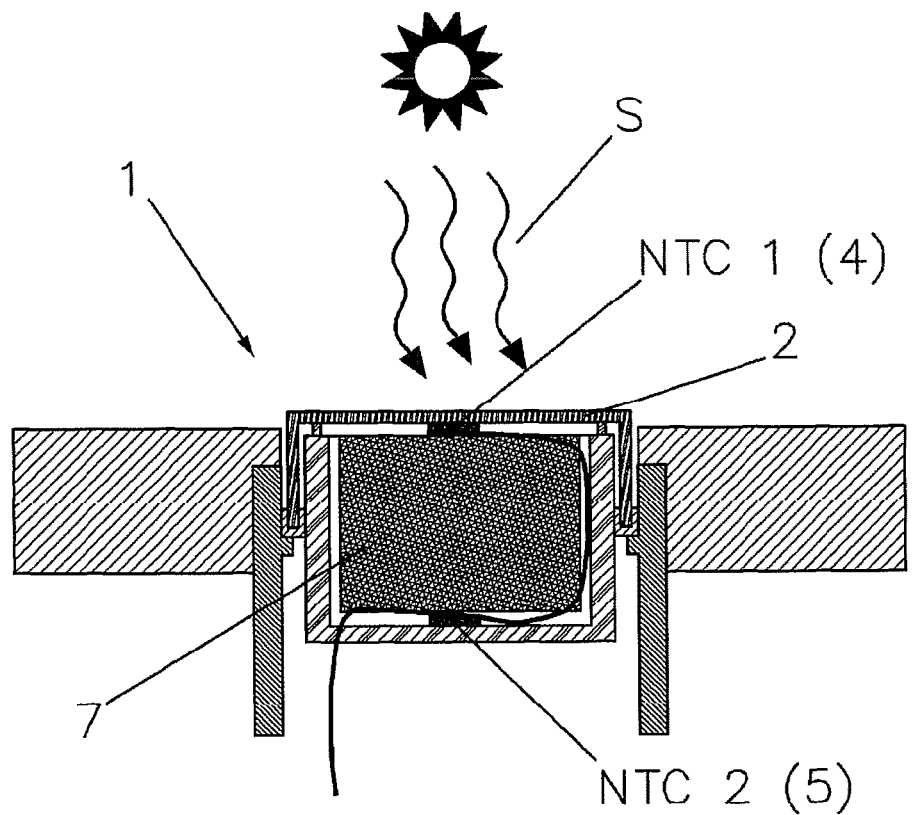
FIG. 4 is a diagram and an associated sensor arrangement in a functional example.
Figure 4:
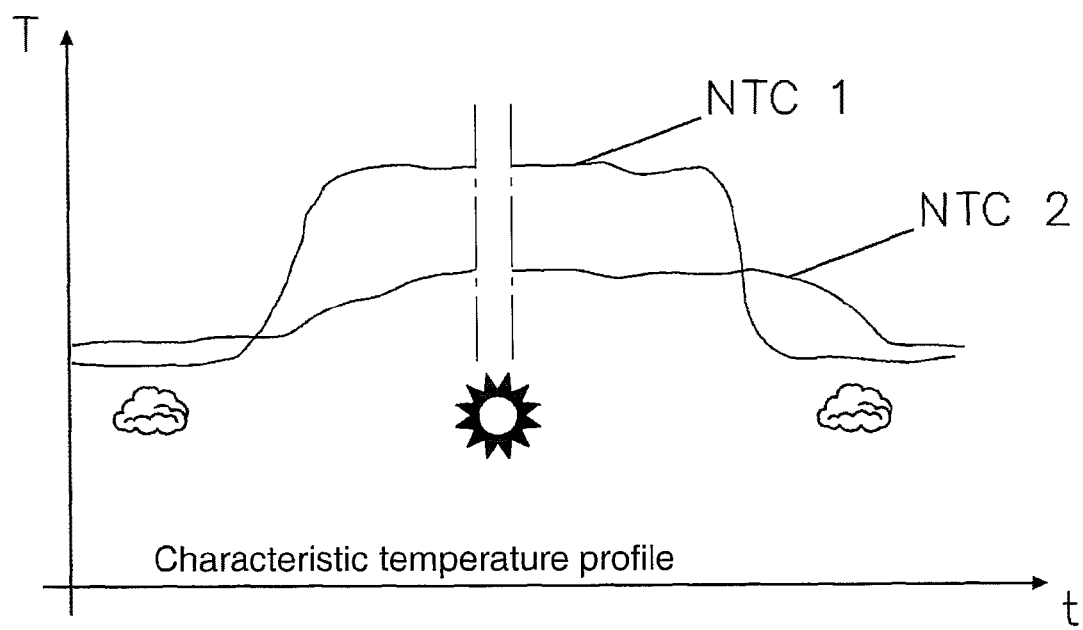

In FIG. 4 the principal function of a sensor arrangement 1 of the invention is shown in a diagram and a schematic sketch. If, as shown, for example, in the top part of FIG. 4, sensor arrangement 1 is impacted directly by solar radiation S, the temperature of resistor 4 changes abruptly, which is shown in the diagram as an increase in the curve NTC 1. This strong direct effect of solar radiation S is followed by the second temperature sensor 5, NTC 2, arranged in the rear section, in other words, behind the insulating material 7, only indirectly, as a result of which an evaluation is enabled to the effect that this is a temporary direct solar radiation. Because of the very good heat conductivity of front wall 2, the temperature in temperature sensor 4 also changes abruptly again after the solar radiation S ceases, which is shown in the diagram with a decline in the curve NTC 1. In this way, it is now possible according to the invention to take into account temporary effects on sensor arrangement 1 and to detect them in downstream evaluation electronics as solar radiation.

In addition, it is also possible according to the invention to arrange several temperature sensors 5, 11, in one regard, in the housing of sensor arrangement 1, and also to attach them in the periphery of sensor 1. To adapt to the climate control unit or to the interior of the motor vehicle, it is conceivable according to the invention to provide a finish for the front wall at least on the side facing the vehicle operator or thereby to adapt it optically.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sensor arrangement for determining an interior temperature in a motor vehicle, which sensor arrangement is at least one part of a climate control panel, the arrangement comprising:

a closed housing having at least one front wall and a rear wall, the front wall being made of a material for facilitating heat transport and the housing being filled with a heat-insulator;

a first temperature sensor attached to a back of the front wall; and a second temperature sensor, which works together with the first temperature sensor at least in regard to evaluating the interior temperature, wherein the second temperature sensor is attached to an inner side of the rear wall that faces the back of front wall, and wherein the rear wall has support domes spaced at a regular interval distance from one another and the front wall lies on the support domes and projects peripherally over the rear wall or projects and surrounds at least one side wall of the rear wall.

2. The sensor arrangement according to claim 1, wherein the front wall is centered over guide rails located at least at the outer region of the rear wall and held at a distance from the rear wall.

3. A sensor arrangement for determining an interior temperature in a motor vehicle, which sensor arrangement is at least one part of a climate control panel, the arrangement comprising:
   a closed housing having at least one front wall and a rear wall, the front wall being made of a material for facilitating heat transport and the housing being filled with a heat-insulator;
   a first temperature sensor attached to a back of the front wall; and
   a second temperature sensor, which works together with the first temperature sensor at least in regard to evaluating the interior temperature,
   wherein the second temperature sensor is attached to an inner side of the rear wall that faces the back of front wall, and
   wherein the rear wall is a cylinder closed on one side and the front wall is kept via support domes at a uniform distance of about 0.15 mm from the open end of the cylinder and is centered over guide rails located at the outer circumference of the cylinder and is held at a distance from the opening.

* * * * *